UNITED STATES PATENT OFFICE.

WILLIAM C. ARSEM, OF SCHENECTADY, NEW YORK, ASSIGNOR TO GENERAL ELECTRIC COMPANY, A CORPORATION OF NEW YORK.

PROCESS OF PURIFYING ASBESTOS.

1,049,972.   Specification of Letters Patent.   Patented Jan. 7, 1913.

No Drawing.   Application filed June 14, 1912.   Serial No. 703,762.

*To all whom it may concern:*

Be it known that I, WILLIAM C. ARSEM, a citizen of the United States, residing at Schenectady, county of Schenectady, State of New York, have invented certain new and useful Improvements in Processes of Purifying Asbestos, of which the following is a specification.

Asbestos, as occurring in nature, is always associated with a difficultly soluble iron compound which appears to be magnetite, $Fe_3O_4$. The iron compound is present in the form of small particles which adhere to the asbestos fibers. As the compound is electrically conducting, it very materially lowers the insulating value of asbestos. The ordinary solvents either do not remove at all, or else attack the asbestos fiber as well as the iron compound.

I have discovered that the compound, which we may assume to be magnetite, may be completely removed from asbestos without any damage to the asbestos, by means of phosphoric acid. The asbestos either as loose fiber or as tape is simply soaked in the solution of phosphoric acid, preferably orthophosphoric acid, $H_3PO_4$. Other phosphoric acids may also be used, for example, the aqueous solution of phosphorus pentoxid $P_2O_5$, which is largely metaphosphoric acid. The solution should be fairly concentrated, in fact, the commercial 50% solution of orthophosphoric acid gives excellent results. The time of treatment, of course, depends upon the size of the magnetite particles, the amount present, the physical form of the asbestos and other factors. The time may vary from 10 hours to 200 hours, but usually 24 to 72 hours are sufficient to remove the magnetite. In some cases, it may be advantageous to shorten the time of treatment and remove the few remaining larger particles mechanically.

In my opinion the magnetite is first converted into ferrous and ferric phosphates which are in turn dissolved in the acid solution. After this acid treatment, the fibers are washed with water, followed preferably with dilute ammonia. The insulating value of the asbestos is increased enormously by this treatment.

It will be understood, of course, that my process is not limited to the treatment of asbestos, but is applicable to the removal of magnetite, and in general difficultly soluble iron compounds from fabrics, or other material containing the same as an impurity.

What I claim as new and desire to secure by Letters Patent of the United States, is:—

1. The process of removing a difficultly soluble iron compound from fibrous material which consists in treating said material with a solution of phosphoric acid.

2. The process of removing magnetite from asbestos which consists in acting upon the asbestos with a solution of orthophosphoric acid.

3. The process of purifying asbestos containing a difficultly soluble conducting metallic compound, which consists in soaking the asbestos in a concentrated solution of phosphoric acid, and then washing with water.

4. The process of purifying asbestos containing a difficultly soluble iron oxid, which consists in soaking the asbestos for 24 to 72 hours in a 50% solution of orthophosphoric acid and then washing the fibers to remove adherent acid.

In witness whereof, I have hereunto set my hand this 11th day of June, 1912.

WILLIAM C. ARSEM.

Witnesses:
 BENJAMIN B. HULL,
 HELEN ORFORD.